(12) United States Patent
Reid

(10) Patent No.: US 7,916,963 B2
(45) Date of Patent: Mar. 29, 2011

(54) METHOD AND APPARATUS FOR AN INTUITIVE DIGITAL IMAGE PROCESSING SYSTEM THAT ENHANCES DIGITAL IMAGES

(75) Inventor: Russell Reid, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/241,029

(22) Filed: Sep. 29, 2008

(65) Prior Publication Data

US 2009/0022417 A1 Jan. 22, 2009

Related U.S. Application Data

(63) Continuation of application No. 10/338,084, filed on Jan. 6, 2003, now Pat. No. 7,447,374.

(51) Int. Cl.
*G06K 9/00* (2006.01)
*G06K 9/40* (2006.01)
*G03F 3/08* (2006.01)
*G09G 5/02* (2006.01)
*H04N 5/202* (2006.01)

(52) U.S. Cl. ........ 382/254; 382/167; 345/590; 348/254; 358/518; 358/519

(58) Field of Classification Search .................. 382/167, 382/172, 254, 270–274; 345/590, 617; 348/254; 358/518–522
See application file for complete search history.

(56) References Cited

U.S. PATENT DOCUMENTS

| | | | | |
|---|---|---|---|---|
| 4,661,843 A | | 4/1987 | Sekizawa et al. | |
| 4,931,864 A | * | 6/1990 | Kawamura et al. | ............ 358/519 |
| 5,216,493 A | * | 6/1993 | DiBella et al. | ................. 348/655 |
| 5,245,432 A | * | 9/1993 | Jaffray et al. | .................. 348/578 |
| 5,509,086 A | * | 4/1996 | Edgar et al. | .................... 382/167 |
| 5,579,446 A | * | 11/1996 | Naik et al. | ....................... 358/1.9 |
| 5,796,861 A | * | 8/1998 | Vogt et al. | ....................... 382/128 |
| 5,808,697 A | | 9/1998 | Fujimura et al. | |
| 6,014,464 A | | 1/2000 | Kurzweil et al. | |
| 6,236,751 B1 | * | 5/2001 | Farrell | ........................... 382/168 |
| 6,384,836 B1 | | 5/2002 | Naylor, Jr. et al. | |
| 6,433,898 B1 | | 8/2002 | Bestmann | |
| 6,535,648 B1 | | 3/2003 | Acharya | |
| 6,999,604 B1 | | 2/2006 | Kim et al. | |
| 7,139,425 B2 | | 11/2006 | Takahashi | |
| 7,263,221 B1 | * | 8/2007 | Moriwaki | ....................... 382/167 |
| 7,283,683 B1 | | 10/2007 | Nakamura et al. | |
| 7,447,374 B1 | | 11/2008 | Reid | |

(Continued)

OTHER PUBLICATIONS

Zhang et al. ("A recursive technique for 3-D histogram enhancement of color images," IEEE proc. of Symp. on Image Analysis and Interpretation, 1996, pp. 218-223).*

(Continued)

*Primary Examiner* — Yubin Hung
(74) *Attorney, Agent, or Firm* — Adeli & Tollen LLP

(57) ABSTRACT

The present invention introduces an intuitive system for digital processing. The system of the present invention allows a user to enhance digital images that appear dark or dull. In one embodiment, the user activates an image enhancement button on a graphical user interface using cursor control device such as a mouse button. In one embodiment, the digital image enhancement system is implemented using a nonlinear brightness level transformation correction and a pseudo gamma correction. The parameters for both the nonlinear brightness level transformation correction and a pseudo gamma correction are determined from examining the properties of the image to be enhanced.

28 Claims, 11 Drawing Sheets

U.S. PATENT DOCUMENTS

2003/0012414 A1* 1/2003 Luo .............................. 382/118
2003/0152283 A1 8/2003 Moriwaki
2003/0179911 A1* 9/2003 Ho et al. ...................... 382/118
2004/0109604 A1 6/2004 Kagawa et al.

OTHER PUBLICATIONS

Misna et al. ("Enhancement of multispectral images using histogram explosion," SPIE vol. 2298, 1995, pp. 132-142).*

Non-Final Office Action of U.S. Appl. No. 10/338,084, May 18, 2006 (mailing date), Reid, Russell.

Final Office Action of U.S. Appl. No. 10/338,084, Nov. 1, 2006 (mailing date), Reid, Russell.

Non-Final Office Action of U.S. Appl. No. 10/338,084, Jun. 6, 2007 (mailing date), Reid, Russell.

Final Office Action of U.S. Appl. No. 10/338,084, Oct. 16, 2007 (mailing date), Reid, Russell.

Non-Final Office Action of U.S. Appl. No. 10/338,084, Mar. 19, 2008 (mailing date), Reid, Russell.

Notice of Allowance of U.S. Appl. No. 10/338,084, Aug. 8, 2008 (mailing date), Reid, Russell.

Portions of prosecution history of U.S. Appl. No. 10/338,084, Sep. 15, 2008, Reid, Russell.

* cited by examiner

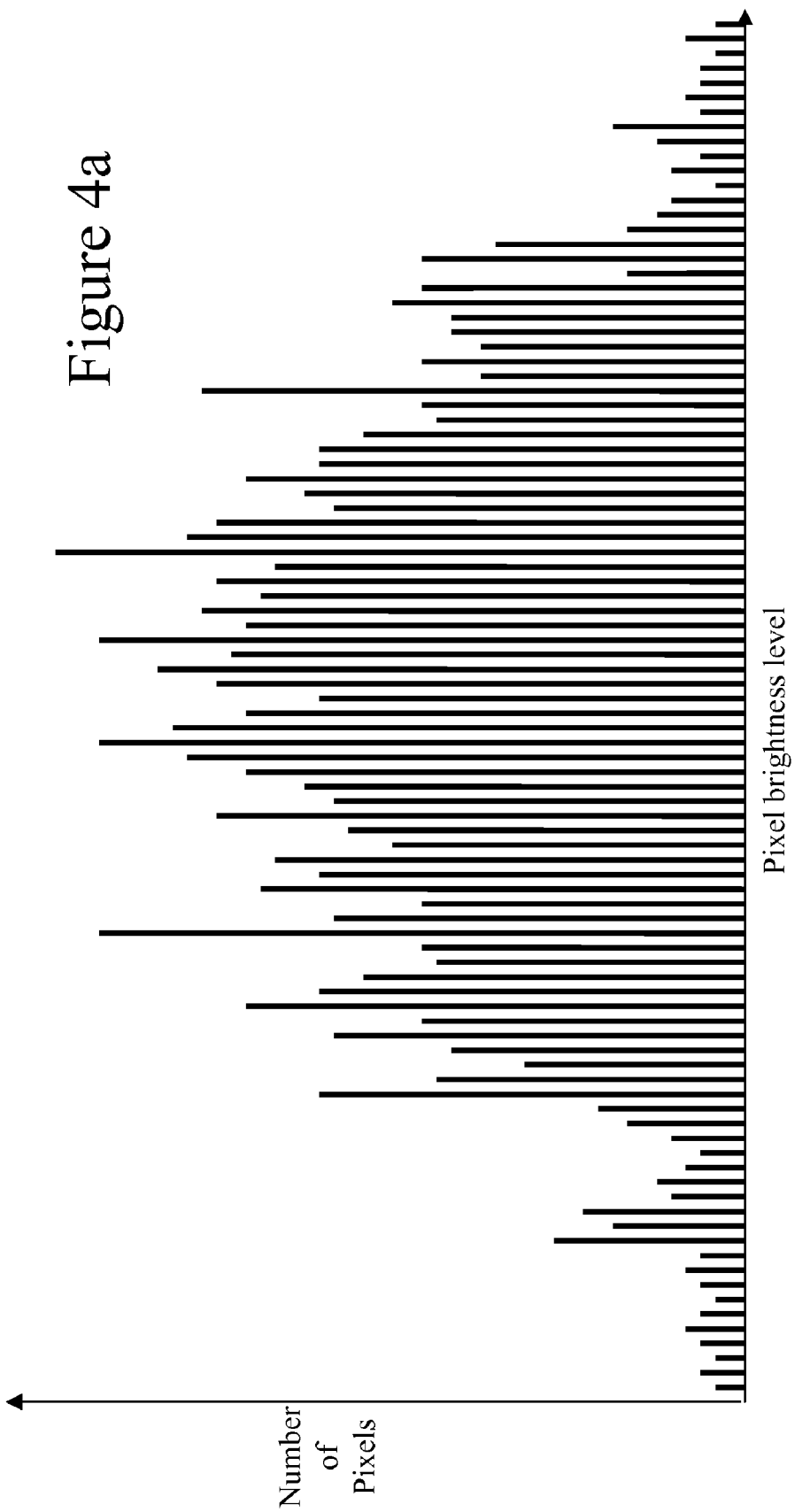

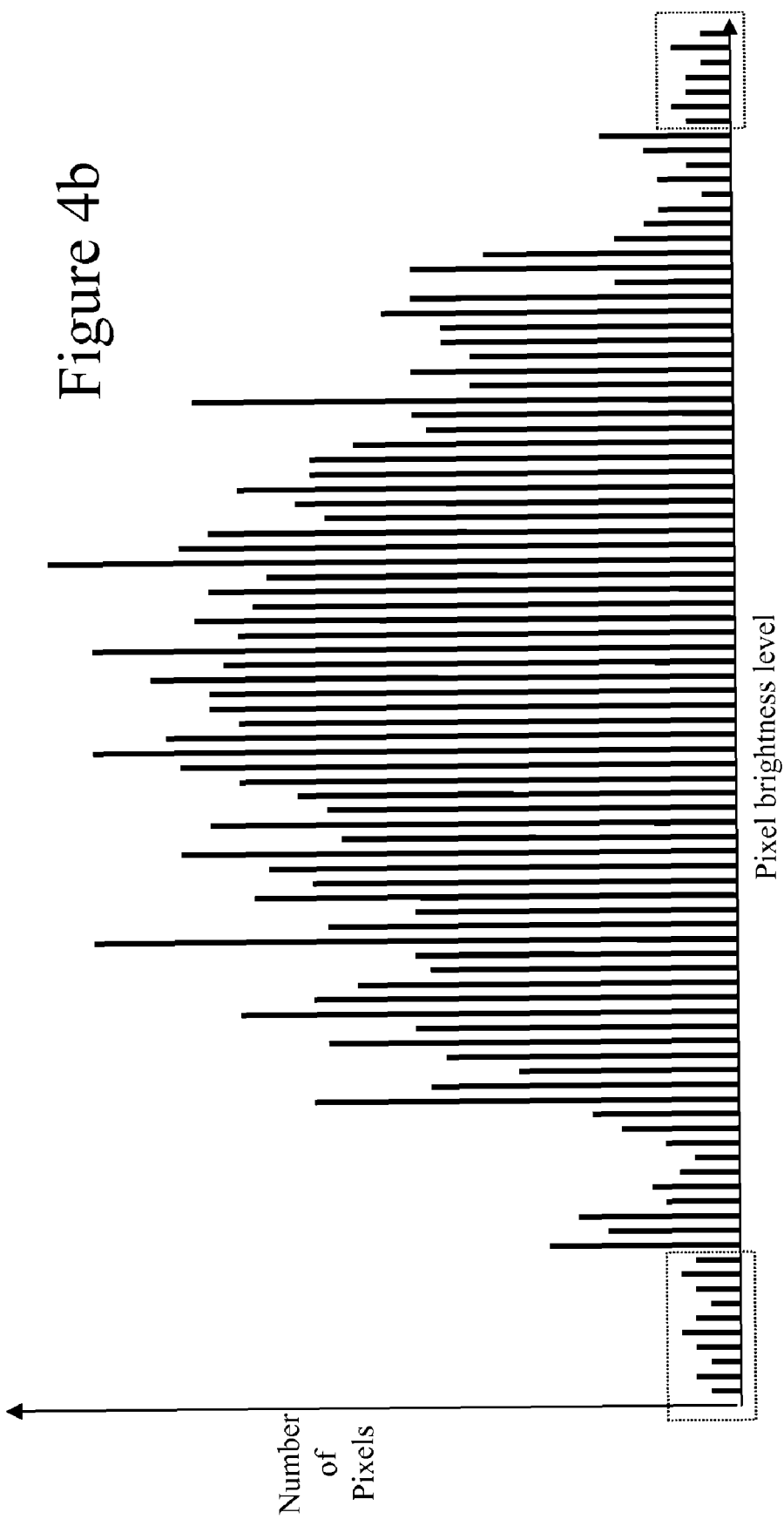

METHOD AND APPARATUS FOR AN INTUITIVE DIGITAL IMAGE PROCESSING SYSTEM THAT ENHANCES DIGITAL IMAGES

CLAIM OF BENEFIT TO PRIOR APPLICATIONS

This Application is a continuation application of U.S. patent application 10/338,084, filed Jan. 6, 2003, now issued as U.S. Pat. No. 7,447,374, which is incorporated herein by reference.

FIELD OF THE INVENTION

The present invention relates to the field of digital photography. In particular, the present invention discloses a system for enhancing digital images.

BACKGROUND OF THE INVENTION

With improved technology and sharply reduced digital camera pricing, digital photography is rapidly replacing traditional film photography. With digital photography, there is no waiting for photographic film to be processed. Instead, most digital cameras allow the photographer to instantly review the digitally captured images. With this ability, the photographer may take another shot if he or she is not satisfied with the first digital images.

Digital photography has given amateur digital photographers new avenues of image distribution. Amateur digital photographs can easily be published on the world-wide web (WWW) to allow anyone on the Internet to view the digital photographs. Internet users can also email digital photographs as attachments or embedded within HTML formatted email messages.

One of the most powerful aspects of digital photography is ability to perform digital image processing. Digital mage processing programs can be used to manipulate digital photographs in order to correct flaws, modify colors, etc. However, the potential of digital image processing by amateurs remains largely unrealized. The only digital image processing used by most amateur digital photographers is the rotation of digital images to correct the orientation of the image. Digital image processing largely remains the domain of experts since quality image processing software is often too expensive for the amateur photographer and too difficult to use for the casual user.

To better realize the great potential of amateur digital photography, it would be very desirable to have improved digital image processing tools that are available for amateur digital photography enthusiasts. These digital image processing tools should be very simple to use yet provide powerful features for manipulating digital images.

SUMMARY OF THE INVENTION

To better realize the great potential of amateur digital photography, the present invention introduces an intuitive system for digital processing. The system of the present invention allows a user to enhance digital images that appear dark or dull. In one embodiment, the user activates an image enhancement button on a graphical user interface using cursor control device such as a mouse button.

In one embodiment, the digital image enhancement system is implemented using a nonlinear brightness level transformation correction and a pseudo gamma correction. The parameters for both the nonlinear brightness level transformation correction and a pseudo gamma correction are determined from examining the properties of the image to be enhanced.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 4a graphically illustrates an example of a brightness histogram.

FIG. 4b graphically illustrates the brightness histogram of FIG. 4a with a set of dark pixels that have been deemed black and a set of light pixels that have been deemed white.

DETAILED DESCRIPTION OF THE PREFERRED EMBODIMENT

A digital image enhancement system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to one particular skin identification method. However, the system of the present invention may be implemented with other types of skin identification methods.

Digital Image Processing

Digital photography is rapidly replacing traditional film photography. One of the most powerful aspects of digital photography is ability to perform digital image processing upon captured digital images. Digital image processing programs can be used to manipulate digital photographs in order to correct image flaws, modify image colors, and perform other image corrections. Most digital image processing can be performed on a typical personal computer system such as the iMac personal computers from Apple Computer, Inc. of Cupertino, Calif.

Image Processing Computer System

Figure 1:
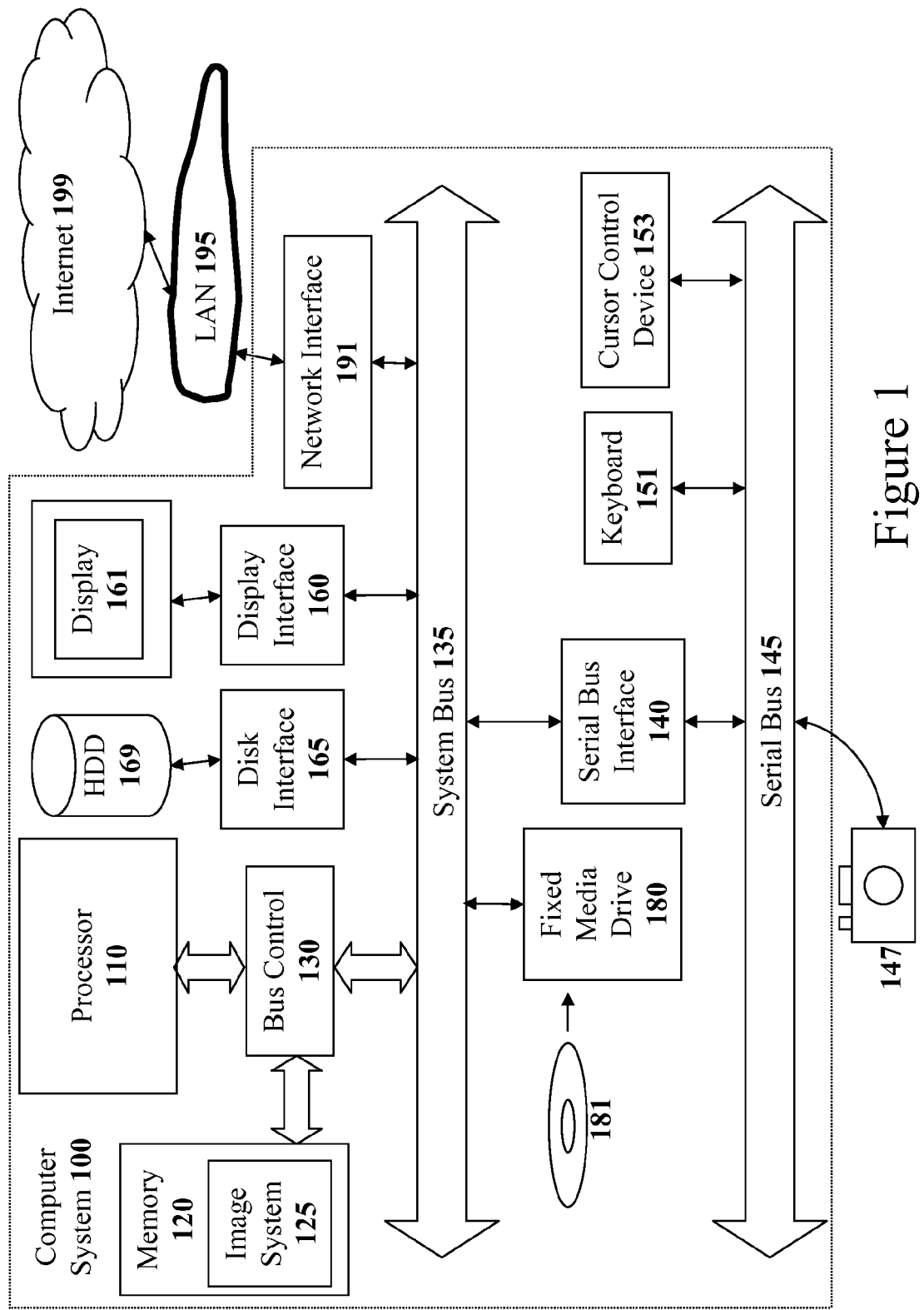
FIG. 1 illustrates a block diagram of a computer system that may be used to implement the teachings of the present invention.

FIG. 1 illustrates an exemplary embodiment of a computer system 100 that may be used to implement the present invention. Computer system 100 may be a typical personal computer system with a processor 110, a memory 120, and a bus controller 130 for controlling a system bus 135. Various different Input/Output devices may be coupled to the system bus 135 to allow the computer system 100 to interact with the outside world. For example, computer system 100 includes the input/output devices of a hard disk drive (HDD) 169, a display device 161 (such as a CRT or flat panel display), a keyboard 151, a cursor control device 153 (such as a computer mouse, track pad, or trackball), a fixed media drive 180, and network interface 191 for coupling to a network such as local area network (LAN) 195.

The image manipulation system 125 of the present invention resides in the memory 120 of computer system 100 as a set of computer instructions. The image manipulation system may also reside as a program on a fixed media device 181 such as Compact Disc Read-Only-Memory (CD-ROM) or Digital Versatile Disc Read-Only-Memory (DVD-ROM). The fixed media device is used with an associated fixed media drive 180 such as a CD-ROM drive or DVD-ROM drive, respectively. Alternatively, the image manipulation system 125 may be downloaded from across a network such as the global Internet 199 accessible through network interface 191.

The first task of the digital image processing system of the present invention is to acquire digital images to process. Referring to FIG. 1, the acquired images are normally stored onto a mass storage device such as hard disk drive (HDD) 169. In one embodiment of the present invention, the digital image processing system 125 may acquire digital images from a number of different sources.

To acquire images, the system of the present invention may include driver software necessary to automatically identify and interoperate with several different types of digital cameras that may be coupled to the host computer system. For example, FIG. 1 illustrates a digital camera system 147 coupled to serial bus 145 controlled by serial bus interface 140 of the computer system 100. Serial bus 145 may be an IEEE 1394 Firewire serial bus, a Universal Serial Bus (USB), or any other type of serial bus. In a preferred embodiment, the system is able to automatically recognize when digital camera system 147 is coupled to computer system 100 such that the digital images in digital camera system 147 can be acquired.

The system can also acquire images in a number of other manners. For example, film photographs may be placed onto a floppy disc (not shown) or onto a fixed media device 181 by a film developer at the request of the film photographer. Such photos may be acquire by image manipulation system 125 by having the user place the floppy disc (not shown) or the fixed media device 181 into the appropriate drive such as floppy disc drive (not show) or the fixed media drive 180.

Digital images may also be obtained through a computer network interface 191 of computer system 100. For example, a user may obtain digital images from a World Wide Web (WWW) site on the global Internet 199. Digital images may also be obtained using a digital scanner (not shown) coupled to computer system 100 as is well known in the art.

Dull Images

Captured digital images do not always appear as the photographers would like the digital images to appear. Photographs taken through automobile or airplane windows may have washed out colors due to the filter effects of the windows. An image captured with insufficient light may appear too dark. Such common undesirable flaws often plague otherwise excellent digital images and make those digital images appear dull.

Film photographs are also susceptible to having such problems. Insufficient lighting also causes dull looking film photographs. Furthermore, a user may set the film speed incorrectly such that many pictures receive the wrong exposure time for the type of film in the camera. These problems can distract the viewer from completely enjoying the captured images.

It would therefore be desirable to provide users with a tool for enhancing dull images. Ideally, the image enhancement solution should be simple and intuitive such that any computer user could easily use the image enhancement tool.

Digital Image Enhancement Overview

Figure 2:
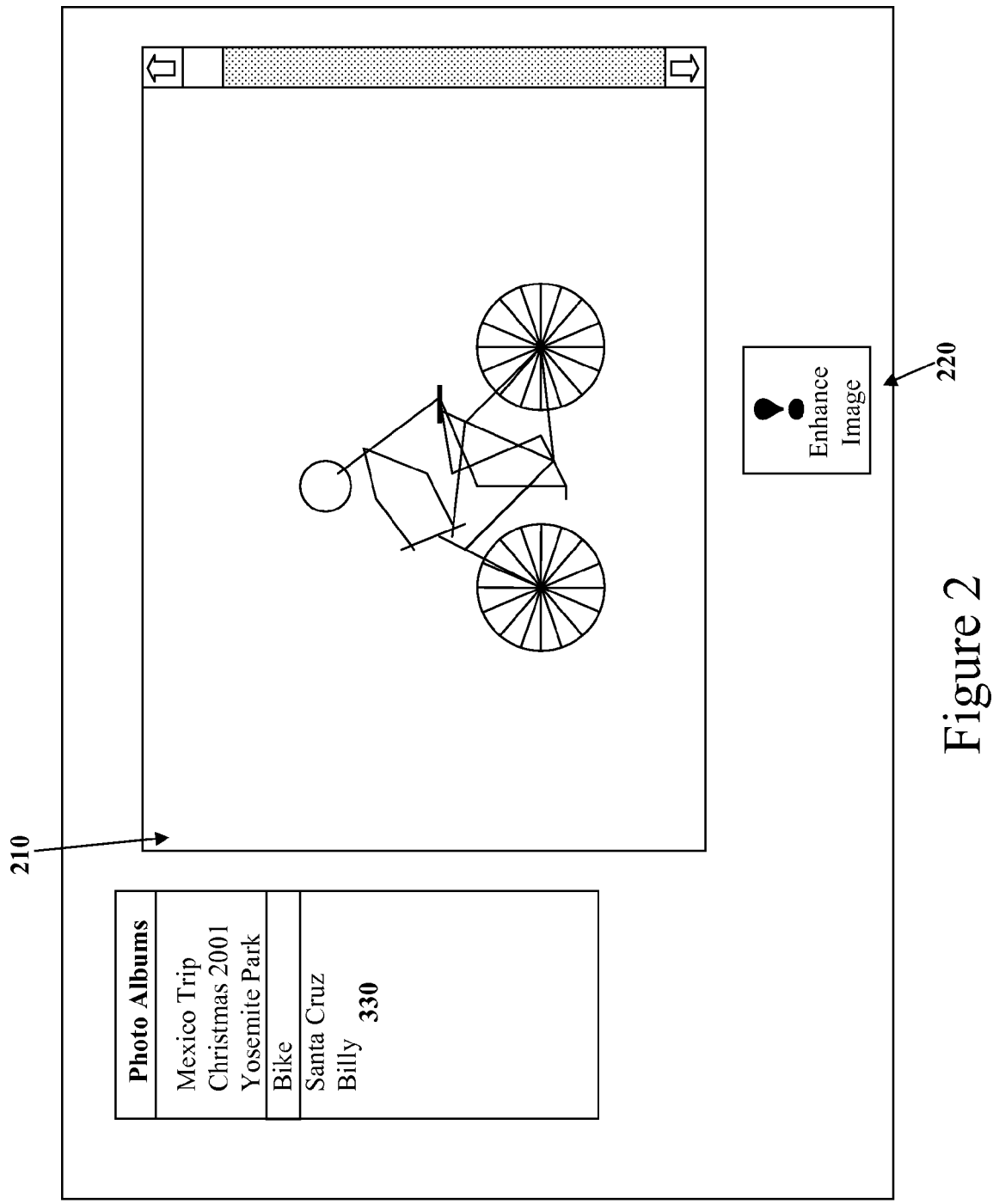
FIG. 2 illustrates one embodiment of an example graphical user interface for the image enhancement system of the present invention.

The present invention introduces a simple and intuitive image enhancement tool that may be used to brighten dull digital images. For example, FIG. 2 illustrates one embodiment of an example graphical user interface for the blemish removal system of the present invention. In FIG. 2, an image window 210 contains an image of bicyclist. However, the image was taken through a car window such that the colors appear muted thus disturbing the perfect image. To enhance the image, the user may activate the image enhancement tool by clicking on image enhancement button 220 using cursor control device such as a mouse button.

Color Adjustment

Figure 3A:
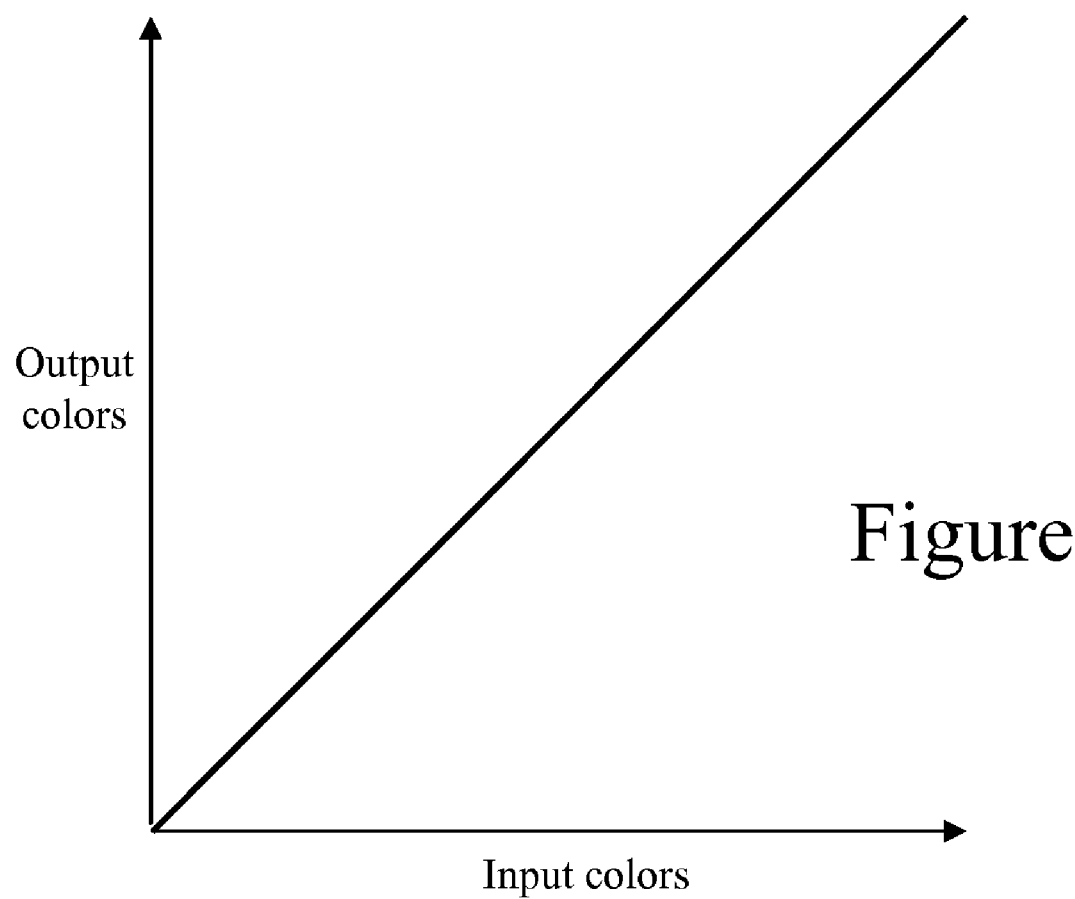
FIG. 3a graphically illustrates a look-up table containing the identity transform.

One method of modifying an image is to adjust the colors in the image. Color adjustment is often performed with a look-up table that outputs an output color for every input color. The effects of a color look-up table can be displayed graphically. FIG. 3a graphically illustrates the results of a look-up table containing the identity transform. Specifically, each input brightness level on the horizontal axis is assigned the same output brightness level. If this is done separately for the display device's constituent colors, such as red, green, and blue in a luminous display or cyan, magenta, and yellow in a printing device, such a look-up table will result in modifications to displayed colors in the images.

Figure 3B:
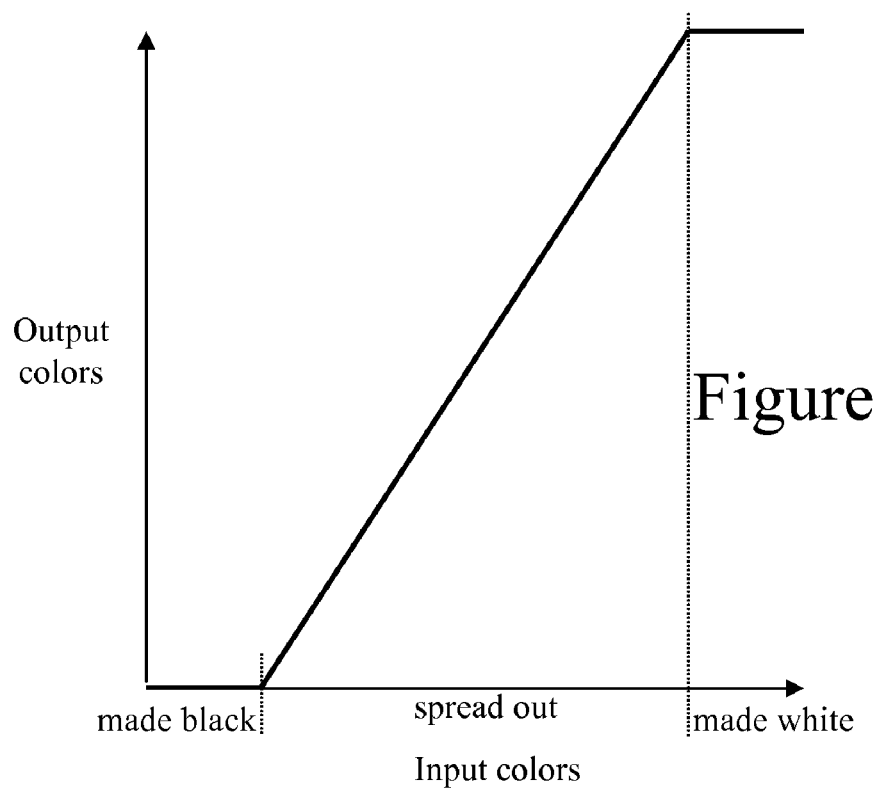
FIG. 3b graphically illustrates a first example of a look-up table containing a contrast change.
Figure 3C:
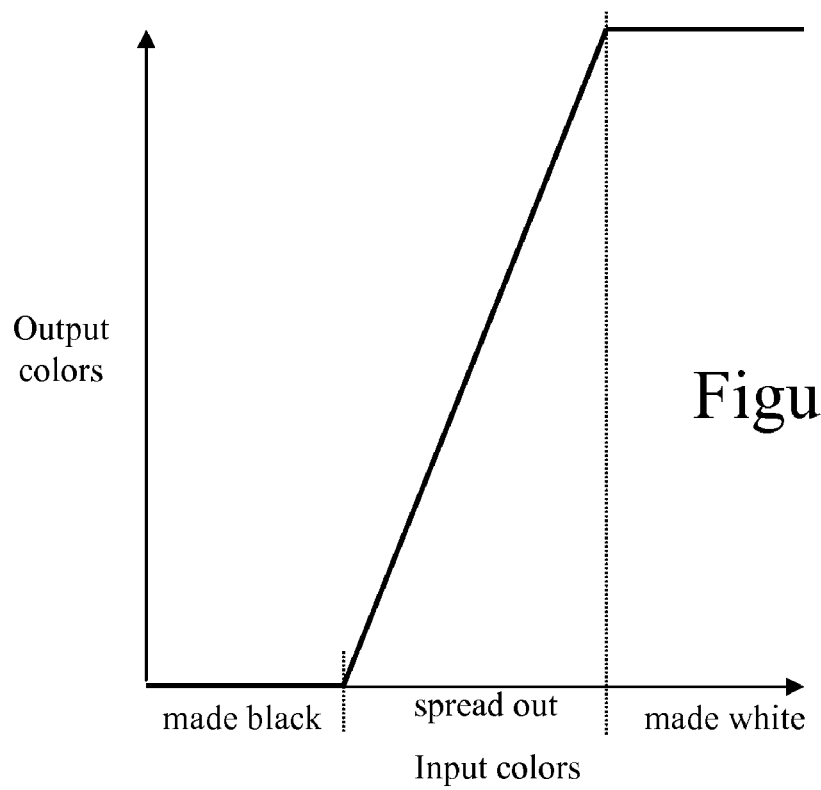
FIG. 3c graphically illustrates a second example of a look-up table containing a contrast change.

A common method of attempting to improve an image is to increase the contrast of the image. Increasing the contrast of an image may be performed by making all the very dark pixels black, making all the very light pixels white, and spreading out the remaining pixel colors across the widened color space. FIG. 3b graphically illustrates the look-up table of an example contrast. As illustrated in FIG. 3b, the dark colors on the left are turned into black, the light colors on the right turned into white, and the remaining colors are spread across the available colors. The contrast function may be adjusted by changing parameters such as the amount of dark colors that become black and light colors. FIG. 3c illustrates a contrast function having different parameter settings. By applying a different transformation to each of the display device's constituent colors, color adjustments are simultaneously performed.

Figure 3D:
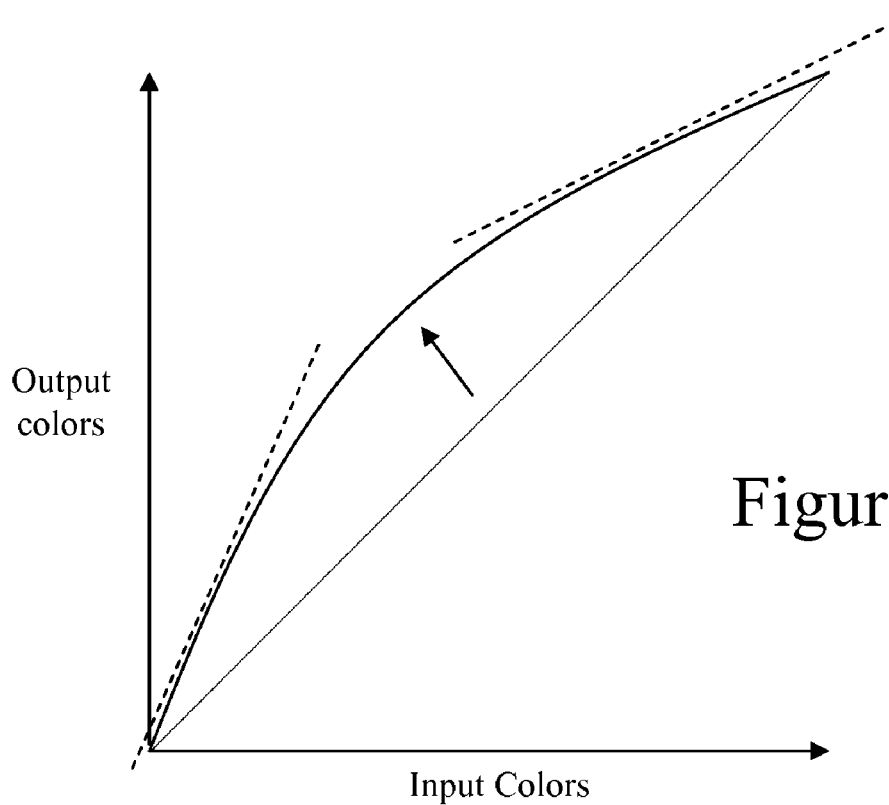
FIG. 3d graphically illustrates a first example of a look-up table containing a gamma color correction.
Figure 3E:
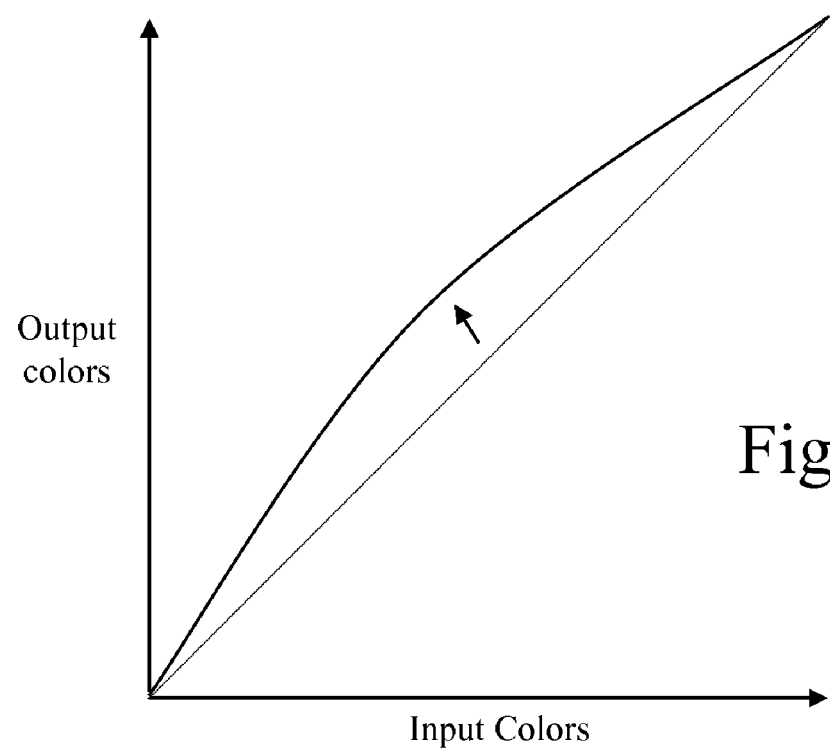
FIG. 3e graphically illustrates a second example of a look-up table containing a gamma color correction.

Another method of attempting to improve an image is to use gamma control to bright the colors. Gamma correction is a nonlinear color correction that increases darker colors more than it increases lighter colors. FIG. 3d graphically illustrates the look-up table of an example gamma correction. As illustrated in FIG. 3d, the darker colors are more dramatically affected as illustrated by the steeper slope of the transform function above the darker colors. The gamma correction may also be adjusted by changing parameters. FIG. 3e illustrates a gamma correction function having different parameter settings that provides less of a boost.

To improve image appearance, the present invention performs a color correction that is a hybrid of a nonlinear brightness level correction combined with a pseudo gamma correction. The parameter settings of both the nonlinear brightness level correction and the pseudo gamma correction are derived by analyzing the contents of the image.

Digital Image Enhancement Embodiment Details

The first step of the image enhancement system of the present invention is to analyze the digital image. To analyze the digital image, one or more histograms are created. The primary histogram used by the present invention is a brightness histogram that specifies how many pixels of each different brightness level exists in the digital image. FIG. 4a graphically illustrates an example of a brightness histogram. In an image with eight bits for each color component (red, green, and blue), there are 256*3 different brightness levels.

The Nonlinear Brightness Level Correction

To perform a nonlinear brightness level correction, the present invention examines a brightness histogram and determines a first set of brightness levels that should be deemed black and a second set of brightness levels that should be deemed white. A number of different methods may be used to determine these sets.

In one embodiment, the system selects all the brightness levels from one end up to a certain fixed percentage. For example, the darkest 2% of pixels may be deemed black and the lightest 2% of pixels may be deemed white. The lightest pixel deemed a black pixel is known as the black cut-off pixel and the darkest pixel deemed white is known as the white cut-off pixel. Such an implementation is functional but a bit rigid.

In another embodiment, the system selects all the brightness levels until a significant change in numbers pixels is detected. For example, all dark brightness level pixels starting from black are deemed black until a brightness level that makes up at least 1% of the pixels in the image is detected. Similarly, all light brightness level pixels starting from white are deemed white until a brightness level that makes up at least 1% of the pixels in the image is detected.

Figure 4C:
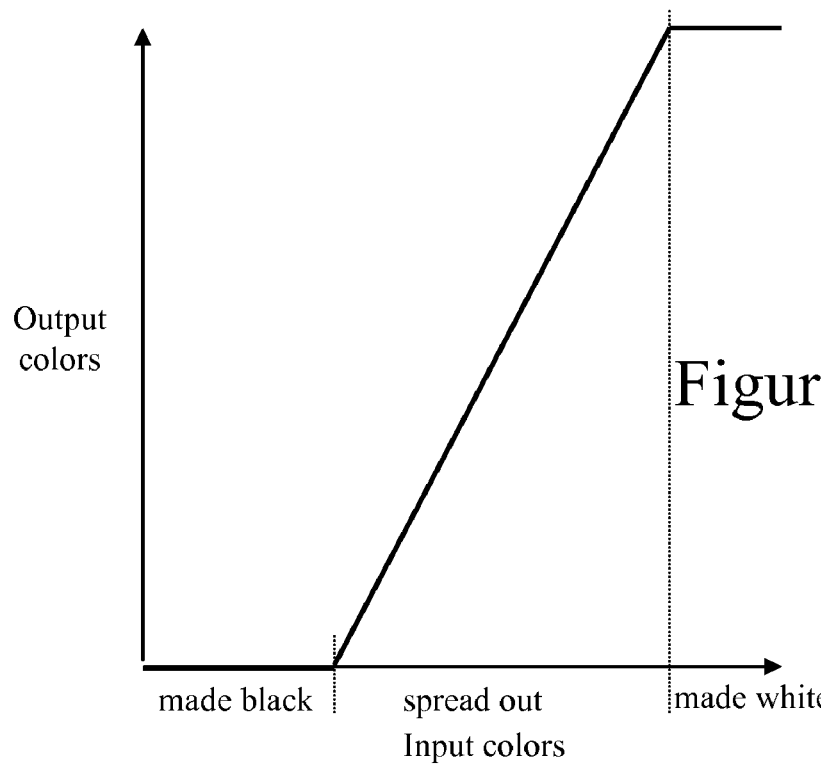
FIG. 4c graphically illustrates a look-up table containing a contrast change built from the set of dark pixels that have been deemed black and the set of light pixels that have been deemed white of FIG. 4b.
Figure 7:
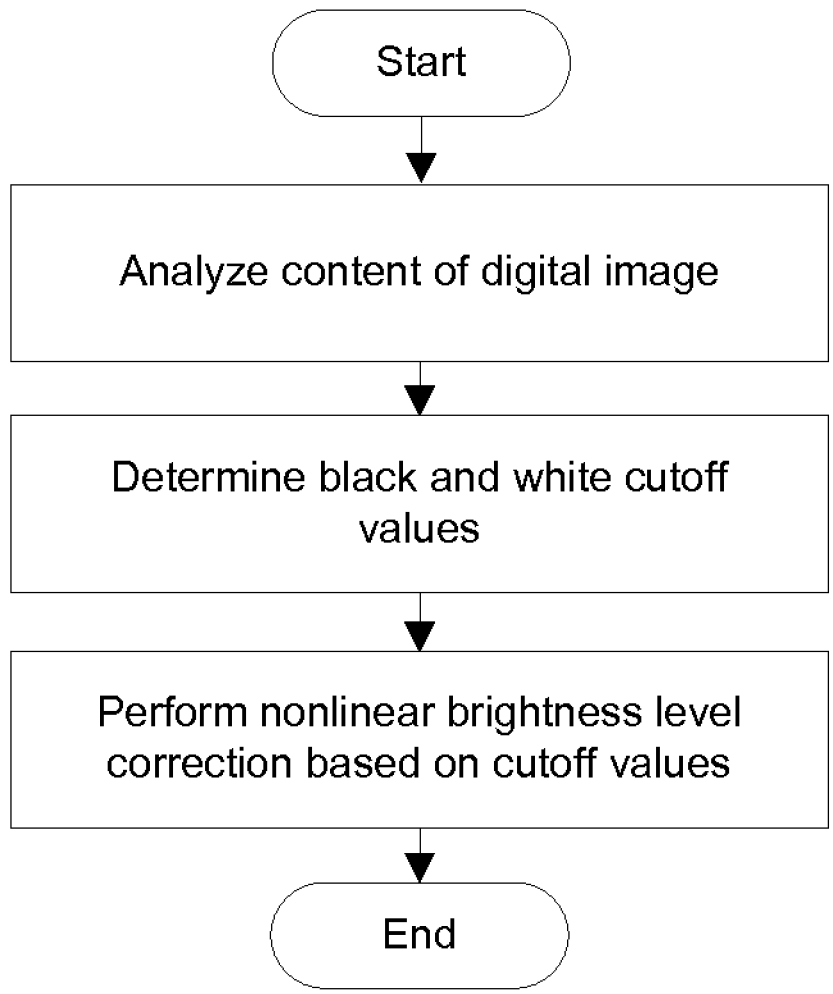
FIG. 7 illustrates a brightness level correction process according to some embodiments.

Once the black cut-off and white cut-off pixels have been selected, a nonlinear brightness level correction function may be constructed. For example, FIG. 4b illustrates the histogram of FIG. 4a wherein a set of pixels at the darkest brightness levels have been deemed black and a set of pixels at the lightest brightness levels have been deemed white. This information can be used to construct the nonlinear brightness level correction function illustrated in FIG. 4c. FIG. 7 illustrates the above described nonlinear brightness level correction of some embodiments.

A Complex Nonlinear Brightness Level Correction Implementation

A number of different methods of determining the black and white cut-off pixels have been investigated. After a long investigation a combination of different approaches was selected. Specifically, the following code specifies how a black cut-off pixel (blackcutoffs) and a white cut-off pixel (whitecutoffs) pixel were selected in a preferred embodiment that provided good results. The red, green, and blue (or other constituent color) values from the cutoff pixels are then used to synthesize separate contrast level transformations for each constituent color, and applying those transforms simultaneously optimizes contrast and adjusts color balance.

```
void histogram (unsigned char *image, unsigned long bytesPerPixel,
    unsigned long width, unsigned long height, //Dimensions of image
    int flag1, float param1,
    float *imageHistogram,    // The global histogram array
    int *blackcutoffs,        // The first point deemed black
    int *whitecutoffs,        // The first point deemed white
    int *blackpoint,          // The representative black point
    int *whitepoint,          // The representative white point
    int *averageFaceBrightness)
{
    unsigned char *pix = image;
    int i, minimumReasonableWhiteCutoff, firstSignificantBlack;
    int npixels = width*height;    // Number of pixels in the image
    unsigned long k;               // Loop counter
    int brightness;
    double averageBrightness, faceBrightnessAccumulator = 0;
    unsigned long brightnessAccumulator = 0;
    double hist1[3*255+1];
    long histbrit[3*255+1], histr[256], histg[256], histb[256], histSkin[256];
    int tmp;
    int xmax, ymax, xmin, ymin;
    int brightmin = 255*3;
    int brightmax = 0;
    float darkest = 255.0*3.0;
    float whitest = 0.0;
    int row, col;
    int offsetArray[ ] = {-width-1, -width, -width+1, -1, +1, width-1, width, width+1};
    int blackThreshold = 0;
    int blackFirstPercentile,blackSecondPercentile,blackThirdPercentile;
    int whiteThreshold = 255;
    int reducedWhiteThreshold[3];
    unsigned char redW = 255, greenW = 255, blueW = 255;
    float samplingFraction = 0.5;
    int samplingStep = (int) (1.0/samplingFraction);
```

-continued

```
    samplingFraction = samplingFraction*samplingFraction; //Because we skip pixels in two
dimensions
    *averageFaceBrightness = −1;
    whitecutoffs[0] = whitecutoffs[1] = whitecutoffs[2] = 250;
    blackcutoffs[0] = blackcutoffs[1] = blackcutoffs[2] = 10;
    xmax = ymax= 0;
        xmin = width − 1;
        ymin = height − 1;
    /* Empty the histograms */
    for (i = 0; i < 3*255+1; i++) { hist1[i] = 0.0; histbrit[i] = 0; }
    for (i = 0; i <= 255;    i++) { histr[i] = 0; histg[i] = 0; histb[i] = 0; histSkin[i] = 0; }
    // Make initial pass, looking at every nth pixel, construct sub sampled histogram.
    // Number of pixels considered here depends on setting of samplingFraction above.*/
    brightnessAccumulator = 0;
    faceBrightnessAccumulator = 0.0;
    for( row = 0; row < height; row += samplingStep ){
        for( col = 0; col < width; col += samplingStep){
            k = row*width+col;                      // Determine pixel index
            pix = image + k*bytesPerPixel;          // Determine pixel address
            brightness = (int) (pix[0]+pix[1]+pix[2]);   // Calculate pixel brightness
            histbrit[brightness] += 1;              // Add brightness to histogram
            brightnessAccumulator += brightness;    // Add pixel's brightness to accumulator
            if (row>height/4 && row<3*height/4 && col>width/5 && col<4*width/5 ){
                if(pixel__is__flesh__colored(image, k*bytesPerPixel, width, height, 0, 0,
                    0.0 , 0, 0, 0, 0, 0 , 1)) {
                    nSkinPixels ++;
                    faceBrightnessAccumulator += (double) brightness;
                    histSkin[brightness/3]++;
                }
            }
        }
    }
    // Calculate average brightness
    averageBrightness = brightnessAccumulator/(3.0*npixels*samplingFraction);
    //Store this in image histogram array. First slots go to r,g,b, and brightness
    imageHistogram[6*256 + 0] = averageBrightness; // Store averageBrightness in global hist array
    if (nSkinPixels > 30) *averageFaceBrightness = faceBrightnessAccumulator/(3.0*nSkinPixels);
    // Determine first significant black as darkest 1/100% pixel
    i = 0;      while(histbrit[i] < 0.0005 * npixels * samplingFraction ){ i++;}
    firstSignificantBlack = i;
    // Don't recalibrate more than 15% of the entire range as black.
    if (firstSignificantBlack > 0.15 * 765.0 ) firstSignificantBlack = .15 * 765.0;
    /*Replace histbrit frequencies with cumulative sum */
    for (i = 1; i <= 3*255; i++) histbrit[i] = histbrit[i−1] + histbrit[i];
    /* Find threshold where cumulative distribution exceeds 4% of the # of pixels sampled above. */
    i = 0;      while( histbrit[i] < 0.04 * npixels * samplingFraction ){ i++;} blackThreshold = i;
    /* Find threshold where cumulative distribution exceeds 1%, 2%, 3%, and 4% of the # of pixels*/
    i = 0;      while( histbrit[i] < 0.01 * npixels * samplingFraction ){ i++;}
    blackFirstPercentile = i;
    i = 0;      while( histbrit[i] < 0.02 * npixels * samplingFraction ){ i++;}
    blackSecondPercentile = i;
    i = 0;      while( histbrit[i] < 0.03 * npixels * samplingFraction ){ i++;}
    blackThirdPercentile = i;
    /* Determine the brightness histogram quartiles */
    i = 0;      while( histbrit[i] < 0.25 * npixels * samplingFraction ){ i++;}
    imageHistogram[6*256 + 1] = i;
    i = 0;      while( histbrit[i] < 0.5   * npixels * samplingFraction ){ i++;}
    imageHistogram[6*256 + 2] = i;
    i = 0;      while( histbrit[i] < 0.75 * npixels * samplingFraction ){ i++;}
    imageHistogram[6*256 + 3] = i;
        /* Set 90% as the minimum reasonable white cut-off */
    i = 0; while (histbrit[i] < 0.90 * npixels * samplingFraction ){ i++;}
    minimumReasonableWhiteCutoff = i;
    i = 3*255; while (histbrit[i] > 0.99 * npixels * samplingFraction) { i−−;} whiteThreshold = i;
    imageHistogram[6*256 + 4] = i; // Set 99th percentile
    //Store 55th percentile.
    i = 0; while (histbrit[i] < 0.55 * npixels * samplingFraction) { i++;}
    imageHistogram[6*256 + 5] = i;
    // Determine more reduced possible white thresholds
    i = 3*255; while (histbrit[i] > 0.995 * npixels * samplingFraction ){ i−−;}
    reducedWhiteThreshold[0] = i;
    i = 3*255; while (histbrit[i] > 0.999 * npixels * samplingFraction ){ i−−;}
    reducedWhiteThreshold[1] = i;
    // Reduce the thresholds if there are too few brightness levels in the middle.
    if (whiteThreshold − blackThreshold < 400) {           // If < 400 brightness levels between then,
        whiteThreshold = reducedWhiteThreshold[1];         // select the most reduced white threshold and
        blackThreshold = blackFirstPercentile;             // the first black percentile
    }
    else if (whiteThreshold − blackThreshold < 570 ) {     // If < 570 brightness levels between then,
        whiteThreshold = reducedWhiteThreshold[1];         // select the most reduced white threshold and
```

```
            blackThreshold = blackSecondPercentile;            // the *second* black percentile.
        }
        else if (whiteThreshold − blackThreshold < 650) {      // If < 650 brightness levels between then,
            whiteThreshold = reducedWhiteThreshold[0];         // select the less reduced white threshold and
            blackThreshold = blackThirdPercentile;             // the *third* black percentile.
        };
//     But if it is less than 10 past the first significant black move it forward.
    if (firstSignificantBlack < blackThreshold − 10) blackThreshold = firstSignificantBlack + 5;
    for(i = 0; i < 3*255 +1; i++) { hist1[i] = 0.0; histbrit[i] = 0;}  // Reset histograms to zero.
/* Now compute a full histogram using all the pixels in the image */;
    for (row = 0; row < height; row++) {                       // Scan across all rows
        for (col = 0; col < width; col++) {                    // Scan across all columns
            k = row*width + col;                               // Determine pixel index
            pix = image + k*bytesPerPixel;                     // Determine pixel address
            brightness = pix[0] + pix[1] + pix[2];             // Calculate pixel brightness
            histr[pix[0]]+=1; histg[pix[1]]+=1; histb[pix[2]]+=1; // Tally this pixel in histogram.
            histbrit[brightness] += 1;                         // Add pixel's brightness to accumulator
            if (brightness > brightmax && brightness <= whiteThreshold)   brightmax = brightness;
            else if (brightness < brightmin && brightness >= blackThreshold ) brightmin = brightness;
            if ((brightness <= brightmin + 10 && brightness >= blackThreshold)  // if pixel is dark and
                    && col>1 && row>1 && row<height−1 && col<width−2) {  // not within 1 pixel from edge
                tmp = brightness;                              // Start with current pixel brightness
                for (i = 0; i < 8; i++) {                      // look at the 8 pixels surrounding the current one
                    pix =image+(k + offsetArray[i])*bytesPerPixel;   // Calculate pixel address
                    tmp += (pix[0] + pix[1] + pix[2]);         // Add pixel's brightness
                }
                tmp = (int) ((float) tmp)/9.0 +0.5;            // Calculate average brightness
                if (tmp < darkest) {                           // If brightness avg < current darkest, then make new darkest
                    pix = image + k*bytesPerPixel;             // Calculate pixel address
                    darkest = tmp;                             // Set current pixel as darkest
                    xmin = col; ymin = row;                    // Set this point as the black point
                    blackpoint[0] = xmin;   blackpoint[1] = ymin;
                    // change black cut off
                    blackcutoffs[0] = pix[0]; blackcutoffs[1] = pix[1]; blackcutoffs[2] = pix[2];
                    tmp = pix[0];    //block some kinds of color correction for black point.
                    if (pix[1] > tmp) tmp = pix[1];            // find largest (color which will be reduced the most)
                    if (pix[2] > tmp) tmp = pix[2];
                    if (tmp == pix[1]) blackcutoffs[1] = darkest/3.0;
                    if (tmp == pix[2]) blackcutoffs[2] = darkest/3.0;
                }
            }
            if ((brightness >= 0.94* brightmax && brightness <= whiteThreshold)  // if light pixel and
                    && col>1 && row>1 && row<height−1 && col<width−2 ){ // not 1 pixel of an edge,
                tmp = brightness;                              // Start with current pixel brightness
                for(i = 0; i < 8; i++) {                       // look at the 8 pixels surrounding the current one
                    pix = image (k + offsetArray[i])*bytesPerPixel;  // Calculate pixel address
                    tmp += (pix[0] + pix[1] + pix[2]);         // Add pixel's brightness
                }
                tmp = ((float) tmp)/9.0 + 0.5;                 // Calculate average brightness
                if (tmp > whitest) {                           // If brightness avg > current whitest, then make new whitest
                    pix = image + k*bytesPerPixel;             // Calculate pixel address
                    whitest = tmp;                             // Set current pixel as whitest
                    xmax = col; ymax = row;                    // Set this point as the white point
                    whitepoint[0] = xmax; whitepoint[1] = ymax;
                    redW    = whitecutoffs[0] = pix[0];        // change white cut off
                    greenW  = whitecutoffs[1] = pix[1];
                    blueW   = whitecutoffs[2] = pix[2];
                }
            }
        }
    }
    if (blueW + 50 < redW && blueW + 40 < greenW ) { //probably found candle or dim bulb
        whitecutoffs[2] = (redW + greenW)/2.0;                 // don't boost the blue an inordinate amount.
        whitecutoffs[0] = (redW + greenW)/2.0;                 // don't reduce the red too much
    }
/*Modify hist1, dividing by pixel count, so hist1 holds percentages (or rather fractions)
instead of absolute counts.*/
    for(i = 0; i <= 3*255; i++){
        hist1[I] = ((double)histbrit[i])/((double)width*height);
        imageHistogram[3*256+i] = hist1[i];
    }
    /* Store histogram data in global histogram array */
    for(i = 0; i < 256; i++){
        imageHistogram[i      ]  = (float)histr[i]/((float) width*height );
        imageHistogram[i+ 256 ]  = (float)histg[i]/((float) width*height );
        imageHistogram[i+2*256]  = (float)histb[i]/((float) width*height );
    }
    return;
}
```

The Pseudo Gamma Correction

Figure 5:
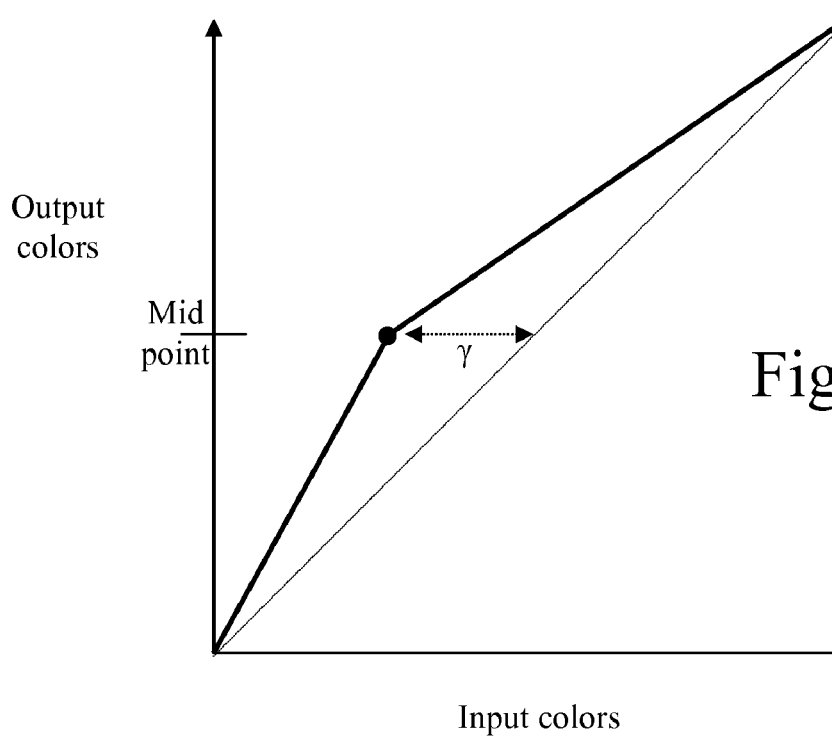
FIG. 5 graphically illustrates an example of a look-up table containing a pseudo gamma color correction.

To further improve the image, a pseudo gamma correction is performed. One embodiment of the pseudo gamma correction uses a pair of correction slopes instead of a gamma correction curve. Specifically, a pair of slopes that meet at the middle output point as illustrated in FIG. 5 may be used to create a pseudo gamma correction. The pseudo gamma correction can be defined using a single gamma ('γ') parameter.

To highlight the people present in an image, it would be desirable to include the main skin colors in the lower slope that provides a greater brightness boost than the higher slope. In order to perform this, the skin colors in the image must be determined. A number of different skin color determining methods have been devised in the art. One method of identifying skin pixels is provided in the following code:

```
static int pixel_is_flesh_colored (unsigned char *pixel, int offset,
        int image_width, int image_height,
        float par1, float par2, float par3, float par4,
        int bool1, int bool2, int bool3, int bool4, int sensitivity )
/* This has a lot of unnecessary parameters right now. */
{
  float r,g,b;
  float r0,g0,b0,A0;
  float whitenessThreshold = .04;
  int isSkinColored = FALSE; // Assume pixel is not skin
  r = (float)pixel[0+offset];
  g = (float)pixel[1+offset];
  b = (float)pixel[2+offset];
  /* calculate normalized color coordinates,
  and also A0, the distance from white */
  r0 = r/(r+g+b + 0.001);
  g0 = g/(r+g+b + 0.001);
  b0 = b/(r+g+b + 0.001);
  A0 = sqrt((r0 - 1/3.0)*(r0 - 1/3.0)+
      (g0 - 1/3.0)*(g0 - 1/3.0)+ (b0 - 1/3.0)*(b0 - 1/3.0));
  if (sensitivity == 1 && r+g+b > 100 &&
      g0 > 0.5367164519094756 - 0.6128005657708601*r0 &&
      g0 > 0.38 - 0.2353293562638825*r0 &&
      g0 > 0.015583841668305133 + 0.5392560632803767*r0 &&
      g0 < 1.484094829686838 - 2.426683826683842*r0 &&
      g0 < 0.5409076086570325 - 0.4758136154405282*r0 &&
      g0 < 0.4177904911910172 - 0.20741151415949488*r0 &&
      g0 < -0.3795460192202154 + 2.103239978034066*r0
  ) isSkinColored = TRUE;
  whitenessThreshold = 0.03;
  if (sensitivity == 2 ) whitenessThreshold = 0.02;
  // Exclude colors that are too white;
  if (sensitivity > 0 && A0 < whitenessThreshold) isSkinColored = FALSE;
      // 0.09 more accurate than 0.02 overall but misses very fair skin.
  return isSkinColored;
}
```

Once the skin pixels have been determined, a brightness of the skin pixels is then determined. The system then determines a 'gamma' parameter that ideally includes the skin pixels in the lower slope. However, the average brightness of the overall image must be taken into consideration. Specifically, if the average brightness of the image is high, then the gamma value may need to be reduced.

The following code provides one example of a method of determining a gamma value for color system that uses eight bits per color component (red, green, and blue):

```
averageBrightness       = imageHistogram[6*256 + 0];
firstBrightnessQuartile = imageHistogram[6*256 + 1];
secondBrightnessQuartile= imageHistogram[6*256 + 2];
thirdBrightnessQuartile = imageHistogram[6*256 + 3];
brightness99thPercentile= imageHistogram[6*256 + 4];
sixtiethPercentile      = imageHistogram[6*256 + 5];
// Perform a nonlinear pseudo gamma brightness correction.
gammaValue = 0.0;
gammaFlag = 1;
facebrightness = *averageFaceBrightness;
if (*averageFaceBrightness > 0 && *averageFaceBrightness < 100
        && (*averageFaceBrightness < sixtiethPercentile/3.0 || averageBrightness < 100)
        && ((*averageFaceBrightness > firstBrightnessQuartile/3 –10 )
            || (*averageFaceBrightness > averageBrightness –20) ))
{
  gammaValue = 0.6*(150.0 - *averageFaceBrightness);
}
else if (*averageFaceBrightness > 0 && *averageFaceBrightness < 80 )
   gammaValue = 0.6*(150.0 - *averageFaceBrightness);
else if (*averageFaceBrightness > 0 && *averageFaceBrightness < 100 )
   gammaValue = 0.6*(135.0 - *averageFaceBrightness);
else if (*averageFaceBrightness > 150)
   gammaValue = 0.66*(160.0 - *averageFaceBrightness);
else if (*averageFaceBrightness > 100)
{
  brightnessTarget = 150.0;
  if (*averageFaceBrightness > averageBrightness– 10)
        brightnessTarget = (sixtiethPercentile/3.0 + *averageFaceBrightness)/2;
        gammaValue = 0.6*(brightnessTarget - *averageFaceBrightness);
}
if (gammaValue > 0 && brightness99thPercentile < 600 && *averageFaceBrightness > 130)
        gammaValue = 0;
if (averageBrightness < 90)                              gammaValue = fabs(gammaValue);
if (gammaValue > 30 )                                    gammaValue = 30;
if (averageBrightness > 75 && gammaValue > 27)           gammaValue = 27;
if (averageBrightness > 100 && gammaValue > 20)          gammaValue = 20;
if (averageBrightness > 100 && facebrightness > 85 && gammaValue > 15)    gammaValue = 15;
if (facebrightness > 65 && gammaValue > 27 )             gammaValue = 27;
// Select the smallest midpoint of red, green, and blue.
midpoint = whitecutoffs[0]/2.0;
```

```
if (whitecutoffs[1]/2.0 < midpoint) midpoint = whitecutoffs[1]/2.0;
if (whitecutoffs[2]/2.0 < midpoint) midpoint = whitecutoffs[2]/2.0;
maxPossibleGamma = midpoint - 20;
if (gammaValue > maxPossibleGamma) gammaValue = maxPossibleGamma;
changeColorLevels(bwBuffer, bytesPerPixel, rowBytes, width, height, blackcutoffs,
        whitecutoffs, gammaValue, gammaFlag, imageHistogram);
```

Figure 8:
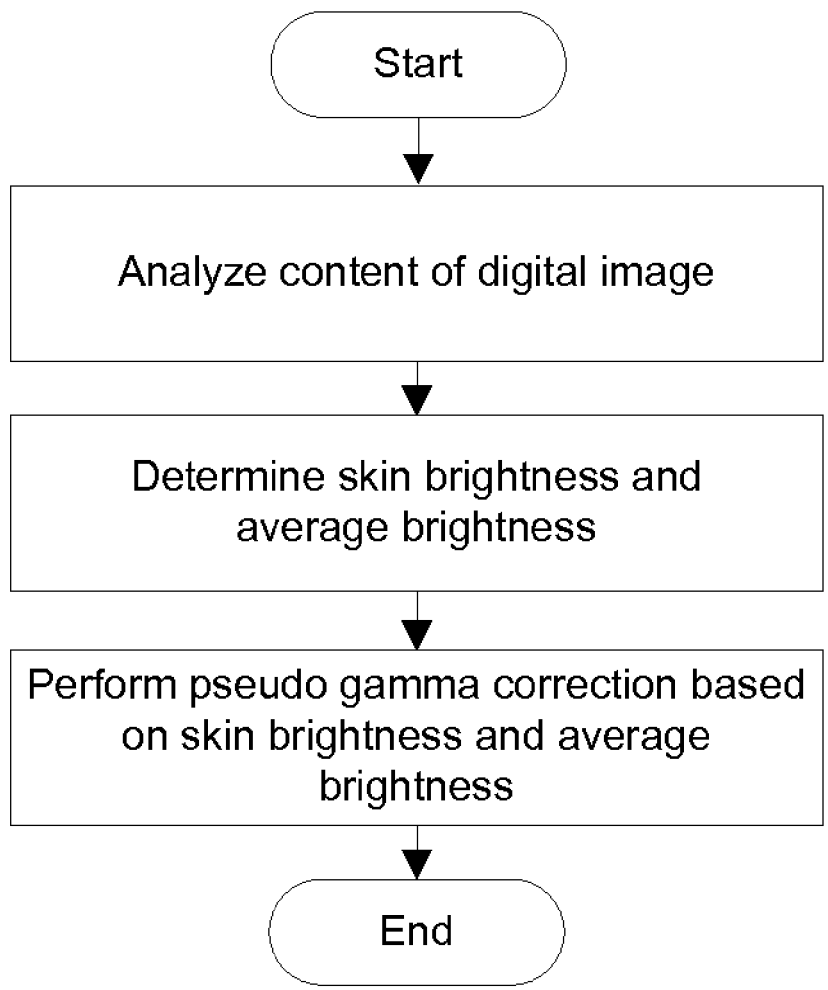
FIG. 8 illustrates a pseudo gamma correction process according to some embodiments.

Once the gamma value has been determined, a pseudo gamma correction look-up table may be created such as the pseudo gamma correction of FIG. 5. FIG. 8 illustrates the above described pseudo gamma correction of some embodiments.

Figure 6:
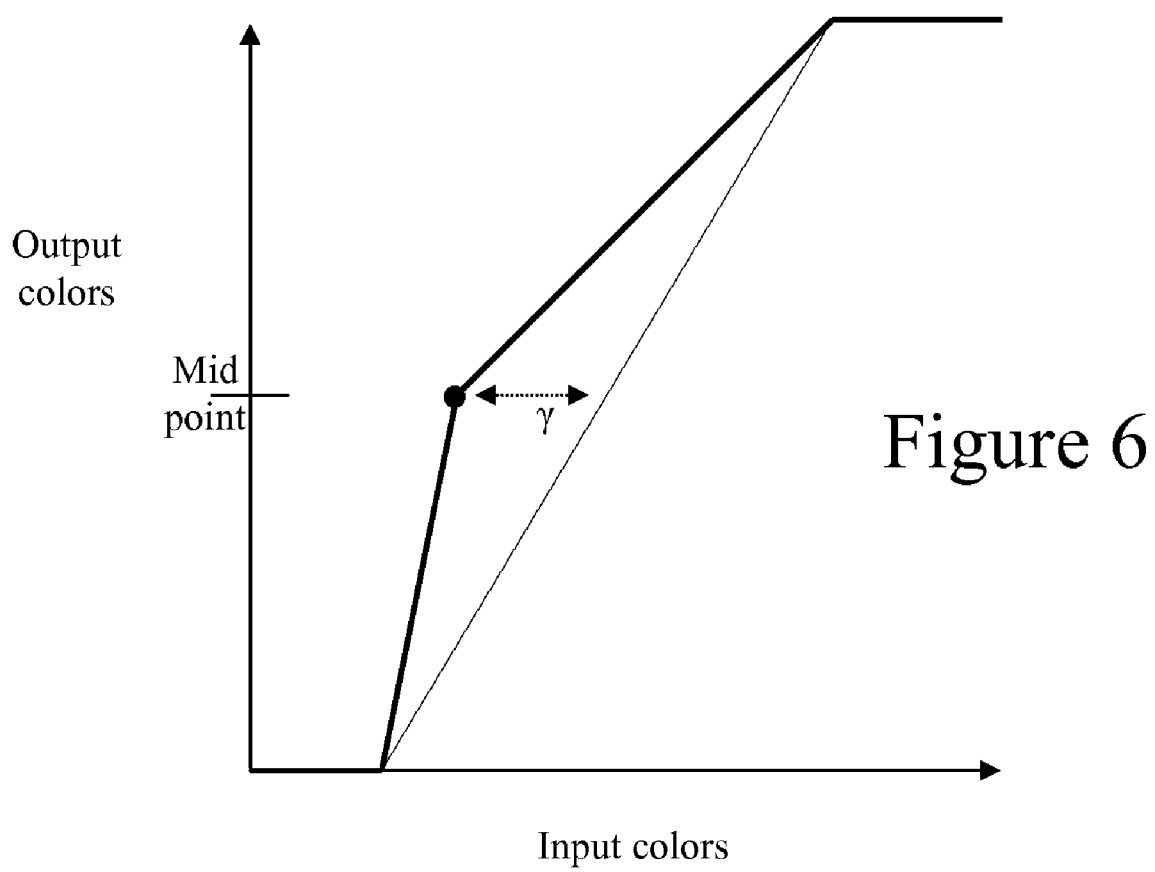
FIG. 6 graphically illustrates an example of a look-up table containing a combined contrast and pseudo gamma color correction.

The contrast change and the pseudo gamma correction may be performed in a single step. FIG. 6 graphically illustrates a look-up table for a combined nonlinear brightness level correction and gamma correction. Note that since the nonlinear brightness level correction is actually different for the red, green, and blue constituent colors, three different combined look-up tables will be created.

The foregoing has described a method and apparatus for performing digital image enhancement. It is contemplated that changes and modifications may be made by one of ordinary skill in the art, to the materials and arrangements of elements of the present invention without departing from the scope of the invention.

I claim:

1. A method of enhancing a digital image on a computing device, said digital image comprising a plurality of pixels defined by reference to a plurality of color components, said method comprising:
   analyzing a distribution of combined color values of at least two color components for the plurality of pixels to identify a pair of black and white cutoff values for each of the at least two color components, each particular component's pair of black and white cutoff values identifying a range of color values for the particular component; and
   for each of the at least two color components, modifying the particular color component's identified range of color values by eliminating color values that fall outside of the identified range and spreading out color values that fall within the identified range across a full range of color values.

2. The method of claim 1, wherein each color component is defined by a range of brightness levels, wherein analyzing the distribution of combined color values comprises generating a histogram that specifies a number of pixels for a range of combined brightness levels with a combined brightness level of a pixel defined as a sum of the pixel's color values for the at least two color components.

3. The method of claim 1, wherein eliminating the color values that fall outside of the identified range comprises:
   changing all color values darker than the particular color component's black cutoff value to black, and
   changing all color values brighter than the particular color component's white cutoff value to white.

4. The method of claim 1, wherein said modifying comprises generating a lookup table for each of the at least two color components.

5. The method of claim 1 further comprising:
   analyzing color values of said digital image along the at least two color components to determine a skin brightness value and an average brightness value; and
   performing a pseudo gamma correction on said digital image based on said skin brightness value and said average brightness value.

6. The method of claim 1, wherein the combined color value of each pixel is a sum of the pixel's color component values.

7. A method of enhancing a digital image on a computing device, said digital image comprising a plurality of pixels defined by reference to a plurality of color components, said method comprising:
   analyzing color component values of said digital image to identify a skin brightness estimate and an average brightness estimate;
   analyzing a distribution of combined color component values of at least two color components for the plurality of pixels to determine at least one cutoff value for each of the at least two color components;
   for the at least two color components, identifying a pseudo gamma correction curve in terms of a plurality of line segments with a plurality of different slopes for specifying a mapping to an output color component value for each of a set of color component values of the plurality of pixels based on the skin brightness estimate, the average brightness estimate, and the cutoff values, wherein one of said line segments is defined to have a steeper slope than other line segments; and
   performing a pseudo gamma correction on each of the at least two color components by using the plurality of line segments to change the set of color component values of the plurality of pixels to produce an enhanced copy of said digital image.

8. The method of claim 7, wherein analyzing a distribution comprises generating a histogram of the combined color component values of the at least two color components for the plurality of pixels.

9. The method of claim 7, wherein the plurality of line segments is a pair of line segments that meet at an output midpoint.

10. The method of claim 9, wherein the identifying comprises determining a single gamma parameter that defines a steepness of the pair of correction slopes based on a comparison of the skin brightness estimate, the average brightness estimate, and the cutoff values.

11. The method of claim 7, wherein analyzing the color component values comprises analyzing the color component values along the at least two color components to identify a set of skin colored pixels.

12. The method of 7, wherein analyzing the color component values comprises analyzing the combined component values of the at least two color components to identify the skin brightness estimate and the average brightness estimate.

13. A method of enhancing a digital image on a computing device, said digital image comprising a plurality of pixels defined by reference to a plurality of color components, said method comprising:
   analyzing a distribution of combined color values of at least two color components for the plurality of pixels to determine a pair of black and white cutoff values for each of the at least two color components;

defining a combined component adjustment operation for each of the at least two color components based on the pair of black and white cutoff values, said combined component adjustment operations for adjusting both gamma and contrast of said digital image; and for each of the at least two color components, performing the corresponding combined component adjustment operation on the color component's color values in order to produce a gamma and contrast adjusted copy of said digital image.

14. The method of claim 13 further comprising analyzing color values of said digital image to identify a set of skin colored pixels for the gamma adjustment.

15. The method of claim 13, wherein said color components comprise red, green, and blue components.

16. The method of claim 13, wherein defining the combined component adjustment operations comprises generating a separate combined look-up table for each of the at least two color components, each separate look-up table specifying contrast and gamma adjusted output color values for the corresponding color component's color values.

17. A non-transitory computer readable medium storing a computer program for enhancing a digital image comprising a plurality of pixels defined by reference to a plurality of color components, said computer program comprising sets of instructions for:

analyzing a distribution of combined color values of at least two color components of the plurality of pixels to identify a pair of black and white cutoff values for each of the at least two color components, each particular component's pair of black and white cutoff values identifying a range of color values that represents a majority of the color values for the particular component but not all of the color values for the particular component; and for each of the at least two color components, modifying the particular color component's identified range of color values by changing color values darker than the particular component's black cutoff value to black, changing color values brighter than the particular component's white cutoff value to white, and spreading out remaining color values across a full range of color values.

18. The computer readable medium of claim 17, wherein each color component is defined by a range of brightness levels, wherein the set of instructions for analyzing a distribution comprises a set of instructions for generating a histogram that specifies a number of pixels for a range of combined brightness levels with the combined brightness level of a pixel defined as a sum of color values for the at least two color components.

19. A non-transitory computer readable medium storing a computer program for enhancing a digital image on a computing device, said digital image comprising a plurality of pixels defined by reference to a plurality of color components, said computer program comprising sets of instructions for:

analyzing combined color component values of the plurality of pixels of said digital image along at least two color components to identify a skin brightness value and an average brightness value for the digital image, each pixel's combined color component value defined by a sum of the pixel's color component values of the at least two color components;

analyzing a distribution of the combined color component values of the at least two color components for the plurality of pixels to identify at least one cutoff value for each of the at least two color components;

defining a customized gamma correction operation that specifies output color component values for the at least two color components based on said skin brightness value, said average brightness value, and said cutoff values; and performing the customized gamma correction operation on each of the at least two color components in order to output color component values that define the color component in a gamma corrected version of said digital image.

20. The non-transitory computer readable medium of claim 19, wherein each color component is defined by a range of brightness levels, wherein the set of instructions for analyzing combined color component values comprises a set of instructions for generating a histogram that specifies a number of pixels for a range of combined brightness levels with a combined brightness level of a pixel defined as the sum of the pixel's color component values for the at least the two color components.

21. A non-transitory computer readable medium storing a computer program for enhancing a digital image on a computing device, said digital image comprising a plurality of pixels defined by reference to a plurality of color components, said computer program comprising sets of instructions for:

defining at least one cutoff value for each of at least two color components of the plurality of pixels by analyzing a distribution of combined color component values of the at least two color components;

defining an average brightness value by analyzing the combined color component values of the at least two color components for the plurality of pixels;

from the plurality of pixels, identifying a set of skin colored pixels having color component values that correspond to skin tones;

defining an average skin brightness value by analyzing combined color component values of the at least two color components for the set of skin colored pixels;

defining a single gamma parameter by comparing the average brightness value, the average skin brightness value, and the cutoff values, said single gamma parameter defining a separate gamma correction that specifies output color component values for each of the at least two color components; and performing the separate gamma correction operation on each of the at least two color components in order to output color component values that define the particular color component in a gamma corrected version of said digital image.

22. The non-transitory computer readable medium of claim 21, wherein the set of instructions for identifying the set of skin colored pixels comprises sets of instructions for:

computing a normalized value for each particular color component value of each particular pixel in a set of pixels by comparing the particular color component value to a sum of color component values of the at least two color components of the particular pixel, identifying a range of values that represent skin tone colors based on the computed normalized values, and determining whether at least one of the computed normalized color values falls within the identified range of values that represent the skin tone colors.

23. The non-transitory computer readable medium of claim 21, wherein each separate gamma operation is defined by a pseudo gamma curve in terms of a plurality of line segments with a plurality of different slopes, wherein one of said line segments is defined to have a steeper slope than other line segments.

24. A method of providing a user interface for an application that enhances digital images on a computing device, said method comprising:
providing an image display area for displaying a digital image comprising a plurality of pixels defined by reference to a plurality of color components; and
providing a color correction control for performing a color correction operation on said digital image by (i) analyzing a distribution of combined color values of the plurality of pixels along at least two color components to identify a pair of black and white cutoff values for each of the at least two analyzed components, wherein a combined color value of each pixel is defined by a sum of the pixel's color values of the at least two components, each particular component's pair of black and white cutoff values identifying a range of color values for the particular component, and (ii) for each of the at least two color components, modifying the particular color component's identified range of color values by eliminating color values that fall outside of the identified range and spreading out color values that fall within the identified range across a full range of color values.

25. The method of claim 24, wherein the modifying comprises generating a look-up table for each of the at least two color components based on the corresponding pair of black and white cutoff values.

26. A method of providing a user interface ("UI") for an application that enhances digital images on a computing device, said method comprising:
providing a display area for displaying a digital image comprising a plurality of pixels defined by reference to a plurality of color components; and
providing a single selection UI item for performing a combined gamma and contrast adjustment operation on said digital image by (i) analyzing a distribution of combined color values of at least two color components for the plurality of pixels to determine a pair of black and white cutoff values for each of the at least two color components, (ii) defining a combined component adjustment for each of the at least two color components based on the black and white cutoff values, said combined component adjustment operations for adjusting both gamma and contrast of said digital image, and (iii) for each of the at least two analyzed color components, performing the corresponding combined component adjustment on the color component's color values in order to produce a gamma and contrast adjusted copy of said digital image.

27. The method of claim 26, wherein defining the combined component adjustment comprises generating a separate combined look-up table for each of the at least two color components, each separate combined look-up table specifying contrast and gamma adjusted output color values for the corresponding color component's color values.

28. The method of claim 26, wherein a single user selection of said UI item by a user of the application causes the application to perform the combined component adjustment operation on said digital image.

* * * * *

UNITED STATES PATENT AND TRADEMARK OFFICE
CERTIFICATE OF CORRECTION

| | | |
|---|---|---|
| PATENT NO. | : 7,916,963 B2 | Page 1 of 1 |
| APPLICATION NO. | : 12/241029 | |
| DATED | : March 29, 2011 | |
| INVENTOR(S) | : Russell Reid | |

It is certified that error appears in the above-identified patent and that said Letters Patent is hereby corrected as shown below:

In column 1, line 37, delete "mage" and insert -- image --, therefor.

In column 14, line 42, in claim 8, delete "a" and insert -- the --, therefor.

In column 14, line 58, in claim 12, delete "of 7," and insert -- of claim 7, --, therefor.

In column 15, line 46, in claim 18, after "The" insert -- non-transitory --.

In column 15, line 48, in claim 18, delete "a" and insert -- the --, therefor.

In column 15, line 51, in claim 18, delete "the" and insert -- a --, therefor.

In column 16, line 49, in claim 21, after "the" delete "particular".

Signed and Sealed this
Sixth Day of December, 2011

David J. Kappos
*Director of the United States Patent and Trademark Office*